M. GRAVATT.
ATTACHMENT FOR ANIMAL TRAPS.
APPLICATION FILED JULY 1, 1908.
911,974.
Patented Feb. 9, 1909.
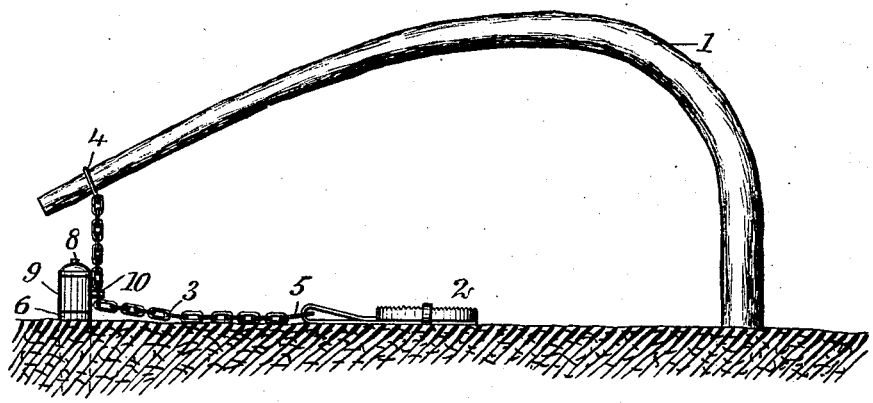
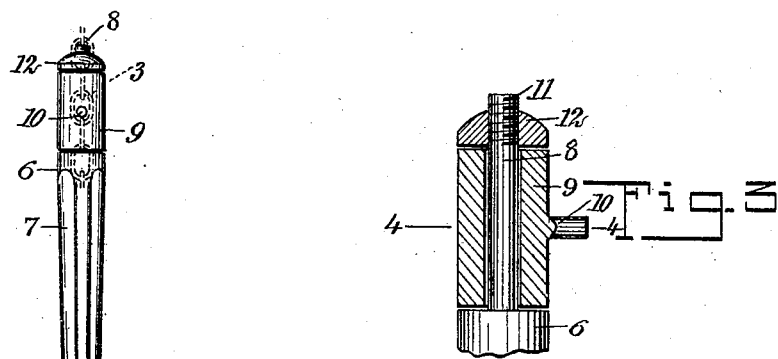
WITNESSES
J. A. Brophy
INVENTOR
Marshall Gravatt
BY
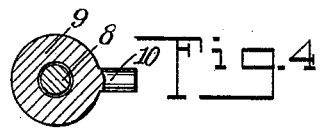
ATTORNEYS

UNITED STATES PATENT OFFICE.

MARSHALL GRAVATT, OF PORT ROYAL, VIRGINIA.

ATTACHMENT FOR ANIMAL-TRAPS.

No. 911,974.  Specification of Letters Patent.  Patented Feb. 9, 1909.

Application filed July 1, 1908.  Serial No. 441,337.

*To all whom it may concern:*

Be it known that I, MARSHALL GRAVATT, a citizen of the United States, and a resident of Port Royal, in the county of Caroline and State of Virginia, have invented a new and Improved Attachment for Animal-Traps, of which the following is a full, clear, and exact description.

This invention relates to attachments for animal traps, and more particularly such as are adapted to be used as securing means for holding saplings or the like, to which traps have been attached, in bent positions until released by the struggles of the animals caught in the traps.

The object of the invention is to provide an attachment for animal traps, simple in construction and inexpensive to manufacture, which serves to hold a resilient member, such as a sapling or the like, to which a trap has been attached, in a bent position.

A further object of the invention is to provide a device of the class described, consisting of a post adapted to be driven into the ground and carrying a rotatable collar above the ground, the latter having a stud for engaging the flexible member commonly used for securing a trap to the end of a bent sapling.

The invention consists in the construction and combination of parts to be more fully described hereinafter and particularly set forth in the claims.

Reference is to be had to the accompanying drawings forming a part of this specification, in which similar characters of reference indicate corresponding parts in all the views.

Figure 1 is a side elevation of an embodiment of the invention, showing it engaging the flexible member which connects a bent sapling and a steel trap; Fig. 2 is an enlarged view of the device, showing, in dotted outline, the manner in which the flexible member is attached to the stud of the rotatable collar; Fig. 3 is an enlarged longitudinal section of the top of the post; and Fig. 4 is a cross section on the line 4—4 of Fig. 3.

Before proceeding to a more detailed description of my invention, it should be understood that my device is particularly adapted to be used for holding a sapling, to the end of which a trap has been attached by means of a flexible member such as chain or the like, in a bent position, until the animal is caught in the trap, when its struggles release the sapling and allow the latter to assume its normal, vertical position. This, of course, raises the animal from the ground and prevents it from escaping by gnawing off its own leg or from its being eaten by some carnivorous animal. The collar on the post is adapted to be rotated in either direction, so that the flexible member will be easily released, no matter to which side of the post the animal attempts to go in its struggles to free itself.

Referring more particularly to the drawings, 1 represents an elongated, resilient member of any suitable material, such as wood or the like, and having one end firmly secured in the ground. Connecting a steel trap 2 to the end of the member 1 is a chain 3, having one end 4 removably secured to the end of the sapling and having its other end 5 secured to the trap 2.

I provide a post 6 of any suitable material, such as metal or the like, having grooves 7 adapted to be driven into the ground at a point adjacent to the end of the member 1 when the latter is in a bent position. The post 6 has a stem 8 at its upper end, which is adapted to be above the ground. Rotatably carried by this stem is a collar 9, having a stud 10, preferably integral therewith. When the flexible member 1 is bent and the trap set, the stud 10 engages one of the links of the chain 3 to hold the device until released. The upper end of the stem 8 has a threaded portion 11 adapted to receive a correspondingly threaded head 12, the latter serving to hold the collar in position on the stem. It should be understood that other forms of traps, such as slip-nooses or the like, may be employed with my device, and that the flexible member 3 need not necessarily be of chain, as wire, cord or the like, may be used.

Having thus described my invention, I claim as new and desire to secure by Letters Patent:

1. In combination a resilient member adapted normally to assume a vertical position, a trap, flexible means connecting said trap and said resilient member, a standard adapted to be driven into the ground, and rotatable means on said standard for engaging said flexible means to hold said resilient member in a bent position.

2. In combination, a resilient member adapted normally to assume a vertical position, a trap, flexible means connecting said trap and said resilient member, a standard adapted to be driven into the ground, said standard having a stem, a rotatable collar carried by said stem, a head arranged on said stem and adjacent to said collar for holding the latter in place, and a stud on said collar for engaging said flexible means to hold said resilient member in a bent position.

In testimony whereof I have signed my name to this specification in the presence of two subscribing witnesses.

MARSHALL GRAVATT.

Witnesses:
W. H. CARTER,
C. P. ROACH, Jr.